United States Patent [19]

Phillips et al.

[11] Patent Number: 5,027,283

[45] Date of Patent: Jun. 25, 1991

[54] ELECTRONICALLY PROGRAMMABLE SPACE-TO-SALES VENDER

[75] Inventors: Paul A. Phillips; Eddie W. King, both of Marietta, Ga.

[73] Assignee: The Coca-Cola Company, Atlanta, Ga.

[21] Appl. No.: 197,297

[22] Filed: May 23, 1988

[51] Int. Cl.$^5$ ................. G06F 15/21; G06F 15/20
[52] U.S. Cl. ...................... 364/479; 364/403
[58] Field of Search ... 364/478, 479, 403, 900 MS File; 221/1, 2, 9, 13

[56] References Cited

U.S. PATENT DOCUMENTS

| | | | |
|---|---|---|---|
| 4,225,056 | 9/1980 | Flubacker | 364/479 |
| 4,639,875 | 1/1987 | Abraham et al. | 364/479 |
| 4,654,800 | 3/1987 | Hayashi et al. | 364/479 |
| 4,706,794 | 11/1987 | Awane et al. | 364/479 |
| 4,812,629 | 3/1989 | O'Neil et al. | 221/13 |
| 4,839,505 | 6/1989 | Bradt et al. | 364/479 |

*Primary Examiner*—Jerry Smith
*Assistant Examiner*—Jim Trammell

[57] ABSTRACT

A vend control mechanism for a multiple product vending machine is controlled electronically by a master control unit to dispense particular products from storage increments in the machine specifically assigned to those products. A code menu is provided for a service person to input codes into the master control unit to reassign storage increments to products to take account of particular product sales volumes for that vending machine.

24 Claims, 2 Drawing Sheets

FIG. 2

SPACE-TO-SALES     BCM

ENTER NO. OF SELECTIONS: | ENTER NO. OF COLUMNS:    B1
             g    q                                g    r

BASIC LEVEL SET            B2
                         g    s

OPTION LEVEL

BEGIN             g    t

ASSIGN "TWO-FER"    g    k    B3

COMPLETION         g    i

PROGRAMMING CHECK        B4
                        g    y

COLUMNS

1 (00)     #5 (04)     #9 (08)     #13 (0c)

2 (01)     #6 (05)     #10 (09)    #14 (0d)    B5

3 (02)     #7 (06)     #11 (0a)    #15 (0e)

4 (03)     #8 (07)     #12 (0b)    #16 (0f)

ELECTRONICALLY PROGRAMMABLE SPACE-TO-SALES VENDER

BACKGROUND OF THE INVENTION

The present invention relates to vending machines which have the capability of providing more or less storage space for particular products to be vended depending upon the sales rates of those products. More particularly, the present invention relates to means for electronically programming the vending machine such that more or less storage space can be allocated to specific designated products by the simple expedient of coded inputs. This assignability of storage space for designated products also requires the electronic coordination of the vending mechanism with the storage space under the same constraints, such that once the storage space is assigned, only designated product will be dispensed from that storage space.

It is highly desirable in a vending machine to have the amount of each product stored in a ratio equivalent to its sales volume. This allows the maximum amount of time to elapse between the routine refillings of the product storage means. Ideally, each product selection would be one item away from soldout when the machine is refilled. A preferred system would be a vending machine where there are several more storage increments than there are product selections wherein the increments may be linked together for particular selections to provide a storage system that closely approximates the relative sales volume of each product. The storage relationship should also be easily altered at a future time, in the event that relative sales volumes between products change. A further desirable characteristic of such a vending system is to add or subtract the number of products offered (selections) to customize the vending system for each installed location. An example of this last feature would be to convert a nine selection vender to a seven selection vender, by eliminating two product selections that have very slow sales rates, and reallocate the storage increments to better serve the sales volume of the remaining seven products.

Space-to-sales vend rack mechanisms of the type generally described are shown in U.S. Pat. No. 4,722,455 of Philip B. Groover, issued Feb. 2, 1988 for INCREASED COLUMN/SELECTIVITY VENDER which is commonly assigned with the present application. The disclosure of that patent is incorporated by reference herein.

Presently, such devices as those in the Groover Patent require various selective manual interconnections of vending mechanisms with product selection buttons and product dispensing or storage columns in order that one or more storage columns may be assigned to a particular designated product. For example, a primary product may be designated such as a particular brand name or container size, and that product may be selected by, for example, an enlarged selection push button on the obverse face of the vender. Secondary products may be individually selected by other product selection buttons particularly assigned to designate such products. If it is desired for the primary product selection button to effect dispensing of a primary product from several storage compartments or columns of the vend mechanism, the vending machine attendant must open the machine and manually select, through switching and other interconnections, a control path from the primary product selection button to the vend mechanisms for all of the storage compartments associated with the primary product. This is sometimes a cumbersome and time consuming task and often requires a panel of toggle switches or the like which are subject to maintenance and other attendant ambient problems.

Therefore, there is a need in the art for a quick and facile way in which to program a vender to assign one or more storage increments, such as product containing vertical columns, to a particular product selection button or control on the obverse face of the vending machine, such that, actuation of that product selection button will result in the dispensing of that product from the assigned storage increments until the supply is exhausted. Optimally this should be achieved with a minimum of mechanical manipulation and primarily by an electronic input.

SUMMARY OF THE INVENTION

Accordingly, it is the primary object of the present invention to provide an electronic means for programming a vending machine to assign particular storage increments, such as compartments or columns, within that machine to a specific designated product.

It is the further object of the present invention to provide an electronic means for programming a vending machine to assign particular storage increments, such as compartments or columns, within that machine to a specific designated product, wherein, the electronic means comprises a bar code reader and microprocessor.

The objects of the present invention are fulfilled by providing a microprocessor controlled vending machine having a central processing unit which is responsive to and programmable by coded inputs which constrain the vending machine to dispense selected products from specifically assigned storage means.

The objects of the present invention are further fulfilled by providing a vending machine having programmable product specific storage space to accommodate product specific sales rates comprising:

a plurality of product storage means for storing the vendable products; product selection means on the obverse face of the vending machine for selectively designating which of a plurality of products are to be dispensed from the said product storage means; a vend control means for selectively vending products from the said product storage means in accordance with the designations of the said product selection means; and programming means for constraining the vend control means to vend designated products from predetermined ones of the product storage means.

More specifically, the programming means may comprise a bar code index means providing a choice of bar codes for assigning the product storage means to designated products and a bar code reading and storage means associated with the vend control means for selecting from the index means and storing in the vend control means selected ones of the bar codes, such that the designated products will be dispensed only from those product storage means specifically assigned thereto by the vend control means in response to the bar code index and inputs.

The bar code index and bar code reader can be replaced by a keyboard or other coded signal input device which can load parameters into the microprocessor.

BRIEF DESCRIPTION OF THE DRAWINGS

The objects of the present invention and the attendant advantages thereof will become more readily apparent by reference to the following drawings wherein like numerals refer to like parts and wherein:

FIG. 2 is a bar code index for use with the vending machine of FIG. 1.

DETAILED DESCRIPTION OF PREFERRED EMBODIMENT

Figure 1:
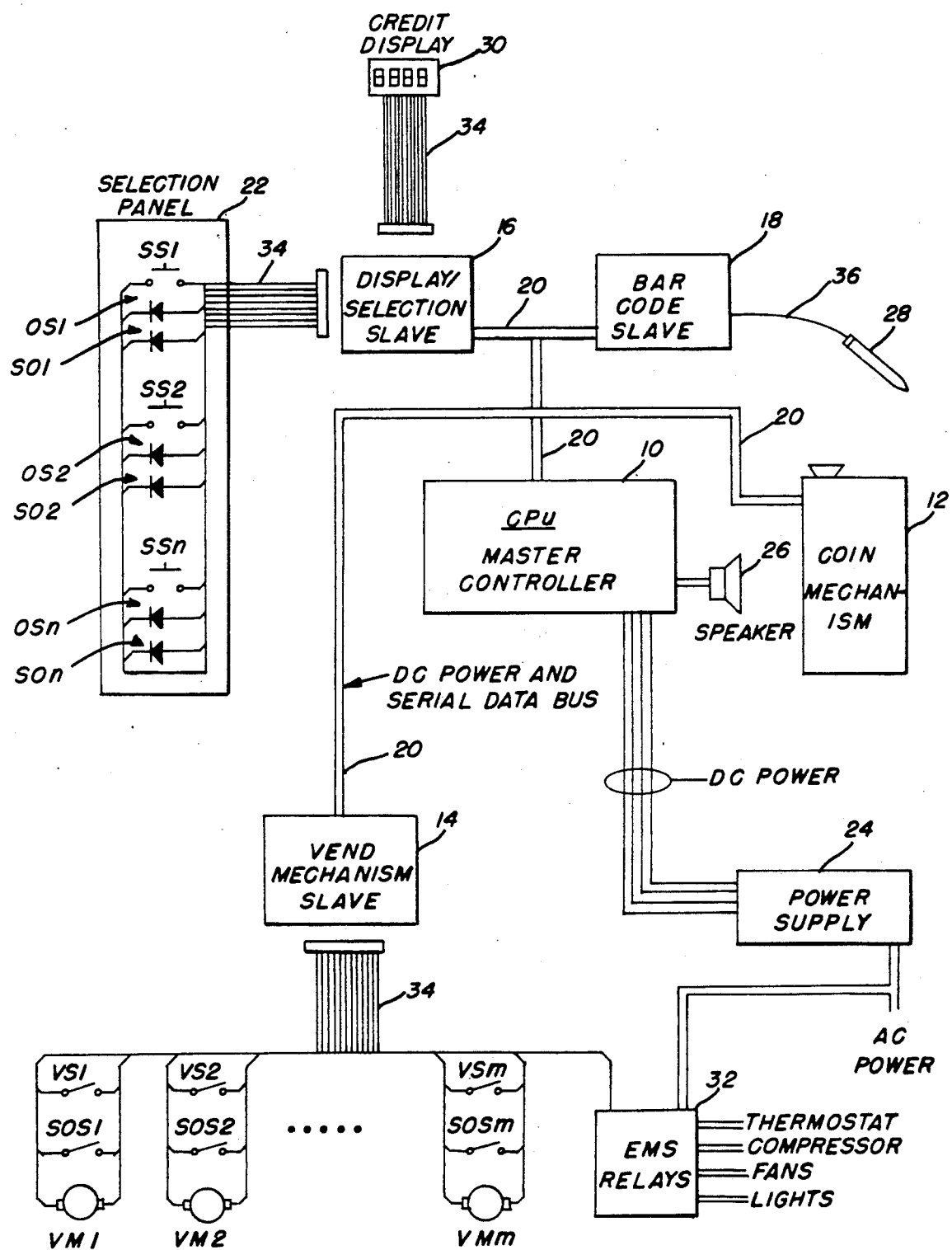
FIG. 1 is a schematic block diagram of a vending machine of the present invention.

Referring in detail to the drawings and with particular reference to FIG. 1, a vending control system embodying the present invention is schematically illustrated as having a main CPU 10, which in a preferred embodiment is an Intel 8031 processor with external 2764 EPROM for program memory (all generally indicated as CPU 10). The CPU 10 is a master controller for a plurality of slave systems such as the coin mechanism slave 12, vend mechanism slave 14, display/selections slave 16 and bar code (encoder) slave 18, and various optional peripheral ports (not shown), all of which have dedicated slave microprocessors such as Intel 8748/8749 (or 8048/8049 mashed ROM) connected through serial data links 20 to the master CPU 10.

A selection panel module 22 is provided in association with the display/select slave 16 for selecting product to be vended by a vending machine embodying the control system and to indicate "ON-SALE" and "SOLD OUT" conditions for each product.

To this end, the selection panel module 22 includes a plurality of product selection switches SS1-SSn, associated ON-SALE indicators comprising light emitting diodes (LED's) 0S1-0Sn and SOLD OUT indicators comprising LED's S01-S0n where "n" is a whole number. In the preferred embodiment described "n" can be any number between 1 and 16, for example. Like numbered switches and indicators are assigned to like numbered products to be vended.

A power supply 24 and speaker 26 are also provided together with a bar code reading pen 28. The speaker 26 is associated with the master CPU 10 for audible indications of proper or improper programming and data entry and the reading pen 28 is for data entry to the master CPU 10 via the bar code slave 18. Instead of the bar code slave 18 and bar pen 28, an encoder slave and digital keyboard or the like may be substituted to provide input data to the master CPU 10. A credit display module 30 is also associated with the display/selection slave 16.

The vend mechanism slave 14 responds to the commands of the master CPU 10 to control vending motors VM1-VMm through vending switches VS1-VSm and sold out switches S0S1-S0Sm where "m" is a whole number indicating a particular product storage increment of the vending machine, such as a product holding column, from which product is vended by actuation of a like numbered vending motor VM1-VMm in a conventional manner known in the art. In a preferred embodiment "m" can also be any number from 1-16.

The vend mechanism slave 14 also has an energy management function involving lamps, fans, compressor, thermostat and the like generally illustrated as EMS RELAYS 32.

The programming and information inputs through the bar code pen 28 are through the bar code slave 18 which may be of any suitable configuration to encode the inputs and transmit them for storage in RAM memory in the master CPU 10.

By way of further general background information, the various slave units have physical input and output connections restricted to their respective immediate control function in the vending environment. For example, the vend mechanism slave 14 is connected to the soldout switches S0S1-S0Sm, the vend control switches VS1-VSm and the vend motors (or solenoids) VM1-VMm of the means for delivering product from the machine to the consumer.

The display/selection slave 16 is connected to the selection panel module 22 and then to the selection switches SS1-SSn, ON SALE LED's 0S1-0Sn and SOLD OUT LED's S01-S0n. Additional connections are provided to a CORRECT CHANGE LED (not shown) and the credit display 16.

Suitable 12—wire connectors 34 are provided between the various slaves and controlled associated peripherals. The bar code pen 28 has a suitable data cable 36 between it and the bar code slave 18.

In the vending machine embodying the present invention, there is no direct physical relationship between the selection panel 22, vending means in the vend mechanism slave 14 and the coin mechanism 12 as would be the case in a conventional electromechanical vender. Instead, these relationships are all defined in the programming of the master CPU 10. This programming exists in two forms. The first is the fixed relationships, rules, and/or limiting boundaries contained in the program memory (firmware) of the master CPU 10. The second is user-defined parameters. A data entry system is required to provide the means by which such user-defined parameters may be ingested and accepted by the master CPU 10 and also to determine the settings within the system of these user-adjusted parameters and store them in RAM in the master CPU 10. The user-adjusted parameter for the present invention is that defining the relationship between the product storage means and product selection means of a vender, to selectively vary the storage increments associated with a designated product in accordance with product sales rates and within the parameters of the particular vender.

Referring now to FIG. 2, a printed bar code menu BCM is illustrated having five information sections B1-B5 which define both programming steps and informational inputs for product space-to-sales parameter selection in a vender having no more than 16 products and 16 storage increments for those products.

The first menu group B1 is used to tell the vend control system the number of product storage increments (columns) and number of product selections used in the machine in which the system is embodied. This entry process enables the control system of the present invention to be used in a variety of vending systems with different storage and selection configurations.

The second menu group B2 is a BASIC LEVEL SET code which applies if a vender is to be used as a more conventional electromechanical vend mode in which a primary product, e.g., Selection #1 is assigned storage increments (columns) 1 and 2 and Selections 2—n are assigned storage increments (columns) 3—(n+1).

The third and fourth menu selections B3 and B4, respectively, are used to provide "Option Level" and "Programming Check" codes to implement the electronically variable space-to-sales function of the present invention.

The fifth menu selection B5 is entitled "columns" and provides in the preferred illustrated embodiment, bar codes for both product selection 1-16 and storage increments designated 1-16. More or less can be provided as desired, such as, 1-32. These codes are used with both the "Basic Level" and "Option Level" programming modes.

OPERATION

Using the bar code menu BCM as the source of coded input information for the master CPU 10, the programming or parameter setting process of the present invention evolves as follows:

First, the system is told the number of product selections and number of product storage increments in the physical configurations of the vender. This is accomplished by reading first the bar code for the process "Number of Selections" or "Number of Columns" from Section B1, followed by a code for the appropriate number form 1 to 16 from Section B5. Next the desired form of programming "Basic" or "Option" is entered by reading the appropriate bar code from Section B2 or Section B3, respectively. It should be noted that the Master CPU 10 indicates a correctly entered bar code having been received via the bar code slave by generating a short beep on its speaker 26. A misread or improper code is indicated by three short beeps.

If "Basic" level is set, no further entries are required for "Space-to-Sales". If "Option" level bar code is entered, the Master CPU 10 will flash the On-Sale LED 0S1 for Selection 1. Bar codes corresponding to the designated storage increments to be assigned to Selection 1 are entered into the CPU 10 by the bar code pen 28 and bar code slave 18 from Section B5. Next, the selection button SS2 for Selection 2 is pressed, and the Master CPU 10 will flash the On-Sale LED 0S2 in the selection panel 22 for Selection 2. Bar codes of the designated increments to be assigned to Selection 2 are then entered into the CPU 10 from Section B5. This process is repeated for the remaining selections. When the assignments are completed for all selections, the bar code "Completion" is entered into the CPU 10 from Section B3. If all programming is done correctly, the Master CPU 10 generates one short beep from the speaker 26. If there is an error, such as a selection or column not assigned, the Master CPU 10 generates three short beeps, and the programming should be checked and corrected. Section B4 contains the "Programming Check" bar code, which is an aid to this process. "Programming Check" invokes a mode where when a code 1-16 is entered from Section B5, the On-Sale LED is illuminated for the selection to which it is assigned. This mode may also be used later as a confirmation of Space-to-Sales programming without using Sections B1-B3.

The bar code menu BCM lends itself to being encapsulated in a clear laminate and being carried as a part of a service person's equipment or being stored within a given vending machine for use only with that machine. Either of such uses of the bar code menu BCM are preferred means of practicing the present invention.

The master CPU 10, as a result of the ingestion of the input codes, comprises an assignment means for correlating specific designated storage increments or columns in the vending machine. When a product selection switch SS1-SSn is closed during a vend cycle, the master CPU 10 generates and emits a representative vend signal for that particular product, which signal is received by the vend mechanism slave 14, which in response to that vend signal activates the vend control means comprised of the various vend motors VM1-VMm, vend switches VS1-VSm, and sold out switches S0S1-S0Sm, correspondingly assigned to the designated storage increments. If more than one storage increment is assigned to a product, these may be emptied in any desired sequence until all products have been vended therefrom. This is readily achieved by firmware in the vend mechanism slave 14 in cooperation with those SOLD OUT deiyvhrd S0S1-S0Sm of the vend control means respectively associated with the storage increments.

As can be seen from the foregoing specification and drawings, the present invention provides a novel and facile system for electronically programming the master control unit of a vending machine to assign storage increments in the machine to those products being vended thereby, such that the relative sales volumes of the respective products can be taken into account to optimize the use of the storage space over the normal service intervals for the machine.

It should be understood that many other variations of the programmable vending control system described herein may be made, as would occur to one of ordinary skill in the are, without departing from the general spirit and scope of the present invention.

What is claimed is:

1. A vending machine having programmable product specific storage space to accommodate product specific sales rates comprising:
   A) a plurality of product storage means for storing vendable products;
   B) product selection means for selectively designating which of a plurality of products are to be dispensed from said product storage means;
   C) central processing means responsive to said product selection means for generating a vend signal corresponding to each product designated by said product selection means;
   said central processing means including code responsive means for programming said central processing means;
   D) vend control means for each of said product storage means for selectively vending product therefrom in response to a corresponding said vend signal; and
   E) encoding means for inputting encoded designations of product and product associated product storage means into said central processing means to constrain said central processing and vend control means to vend a product designated by said selection means from those product storage means designated by said encoding means,
   said encoding means including an encoding menu means of a visible readable menu of codes for enabling said encoding means to input to said vend control means the number of products and the number of product storage means assignable to the products in a given machine, and assignment instructions for designating which of said product storage means are assigned to which of the products.

2. A vending machine having programmable product specific storage space to accommodate product specific sales rates comprising:

A) a plurality of product storage means for storing vendable products;

B) product selection means for selectively designating which of a plurality of product are to be dispensed from said product storage means;

C) vend control means for selectively vending products from said product storage means in accordance with the designations of said product selection means; and D) programming means for constraining said vend control means to vend designated products from predetermined ones of said product storage means; said programming means comprising:

1) bar code menu means for providing a choice of bar codes for assigning said product storage means to designated products, and 2) bar code reading and storage means for selecting from said bar code menu means and storing in said vend control means, selected ones of said bar codes such that said designated products will be dispensed only from said assigned product storage means by said vend control means.

3. The vending machine of claim 2, wherein said bar code menu means contains bar codes unique to each product storage means; wherein said programming means is jointly responsive to said product selection means and said bar code reading and storage means to effect the assignment of said product storage means corresponding to selected one of said bar codes to a product designated by said product selection means.

4. The vending machine of claim 3, wherein:

at least one of said products is assigned a primary product designation and the remainder of said products are assigned a respective plurality of sequential secondary product designations; and said programming means is collectively responsive first to a said product designation and second to a bar code unique to at least one of said product storage means, to effect said assignments of said product storage means to said products.

5. The vending machine of claim 4, wherein:

said programming means is constrained to accept said assignments of said storage means in sequence defined by said primary and secondary product designations and no more than one product to a given storage means; and said programming means further includes means for detecting a variance condition from said sequence and the parameter of one product per storage means for providing an error indication of either said variance condition.

6. The vending machine of claim 2, wherein said programming means includes assignment means responsive to said bar code reading means for assigning a plurality of product storage means to a predetermined primary product.

7. The vending machine of claim 6, wherein said assignment means is further responsive to said bar code reading means to assign at least one predetermined secondary product to a remaining product storage means.

8. The vending machine of claim 2, wherein:

at least one of said products is assigned a primary designation and the remainder of said products are assigned a respective plurality of sequential secondary designations;

said product storage means are identified by sequential designations; and said programming means includes assignment means responsive to said bar code reading means for assigning at least the first two of said product storage means to said primary product and the remainder of said storage means, in sequence to the said secondary products.

9. A vending machine having programmable product specific storage space to accommodate product specific sales rates comprising:

A) a plurality of product storage means for storing vendable products;

B) product selection means for selectively designating which of a plurality of products are to be dispensed from said product storage means;

C) vend control means for selectively vending products from said product storage means in accordance with the designations of said product selection means; and D) programming means for constraining said vend control to vend designated products from predetermined ones of said product storage means; said programming means including, 1) encoding menu means providing a choice of codes for assigning said product storage means to designated products, and 2) encoding and storage means for selecting from said menu means and storing in said vend control means, selected ones of said codes such that said designated products will be dispensed only from said assigned product storage means by said vend control means, wherein said encoding menu means comprises a visible readable menu of codes for enabling said encoding and storage means to input to said programming means the number of products and the number of storage increments assignable to said products in a given machine, and assignment instructions for designating which of said storage increments are assigned to which of said products.

10. The vending machine of claim 9, wherein said encoding menu means contains codes unique to each product storage means; wherein said programming means is jointly responsive to said product selection means and said encoding and storage means to effect the assignment of said product storage means corresponding to selected ones of said codes to a product designated by said product selection means.

11. The vending machine of claim 10, wherein:

at least one of said products is assigned a primary product designation and the remainder of said products are assigned a respective plurality of sequential secondary product designations; and said programming means is collectively responsive first to said product designation and second to a code unique to at least one of said product storage means, to effect said assignments of said product storage means to said products.

12. The vending machine of claim 11, wherein:

said programming means is constrained to accept said assignments of said storage means in sequence defined by said primary and secondary product designations and no more than one product to a given product storage means; and said programming means further includes means for detecting a variance condition from said sequence and the parameter of one product per storage means for providing an error indication of either said variance condition.

13. The vending machine of claim 9, wherein said programming means includes assignment means responsive to said encoding means for assigning a plurality of product storage means to a predetermined primary product.

14. The vending machine of claim 13, wherein said assignment means is further responsive to said encoding means to assign at least one predetermined secondary product to a remaining product storage means.

15. The vending machine of claim 9, wherein:
at least one of said products is assigned a primary designation and the remainder of said products are assigned a respective plurality of sequential secondary designations;
said product storage means are identified by sequential designations; and
said programming means includes assignment means responsive to said encoding means for assigning at least the first two of said product storage means to said primary product and the remainder of said storage means, in sequence, to said secondary products.

16. The vending machine of claim 9, wherein said menu of codes further includes at least one code for enabling predetermined assignments of storage increments to primary and secondary products.

17. The vending machine of claim 16, wherein said menu of codes further includes codes for enabling selective assignments of storage increments to primary and secondary products.

18. The vending machine of claim 9, wherein said menu of codes further includes codes for enabling selective assignments of storage increments to primary and secondary products.

19. The vending machine of claim 9, wherein said menu of codes further includes at least one code for instructing said programming means that the assignment of storage increments to products has been completed.

20. A vending machine having programmable product specific storage space to accommodate product specific sales rates comprising:
A) a plurality of product storage means for storing vendable products;
B) product selection means for selectively designating which of a plurality of products are to be dispensed from said product storage means;
C) central processing means responsive to said product selection means for generating a vend signal corresponding to each product designated by said product selection means;
said central processing means including codes responsive means for programming said central processing means;
D) vend control means for each of said product storage means for selectively vending product therefrom in response to a corresponding said vend signal; and
E) encoding means for inputting encoded designations of product and product associated product storage means into said central processing means to constrain said central processing and vend control means to vend a product designated by said selection means from those product storage means designated by said encoding means;
said encoding means comprising a visible readable menu of codes for enabling said encoding means to input to said code responsive means in said central processing means the number of products and the number of storage increments assignable to said products in a given machine, and assignment instructions for designating which of said storage increments are assigned to which of said products.

21. The vending machine of claim 20, wherein said menu of codes further includes at least one code for enabling predetermined assignments of storage increments to primary and secondary products.

22. The vending machine of claim 21, wherein said menu of codes further includes codes for enabling selective assignments of storage increments to primary and secondary products.

23. The vending machine of claim 20, wherein said menu of codes further includes codes for enabling selective assignments of storage increments to primary and secondary products.

24. The vending machine of claim 20, wherein said menu of codes further includes at least one code for instructing said code responsive means that the assignment of storage increments to products has been completed.

* * * * *